Dec. 26, 1961  R. J. GALES  3,014,769
CAGE FOR ROLLER BEARING ASSEMBLY
Filed May 13, 1959

INVENTOR.
RICHARD J. GALES
BY Albert Sperry
ATTORNEY

United States Patent Office

3,014,769
Patented Dec. 26, 1961

3,014,769
CAGE FOR ROLLER BEARING ASSEMBLY
Richard J. Gales, Morrisville, Pa., assignor, by mesne assignments, to Ex-Cell-O Corporation, Detroit, Mich., a corporation of Michigan
Filed May 13, 1959, Ser. No. 812,931
2 Claims. (Cl. 308—213)

This application is a continuation in part of my copending application Serial No. 732,300, filed May 1, 1958.

This invention relates to roller bearing assemblies and is directed particularly to constructions embodying a novel type of cage for holding the rollers in predetermined spaced relation. The invention also relates to methods by which such a cage may be produced.

It is usual practice to provide roller bearing assemblies with a cage consisting of a cylindrical member having spaced parallel slots therein for receiving and holding the rollers. When the cage is designed to be located on the pitch line of the rollers, the slots are formed of greater width than the diameter of the rollers so as to permit the rollers to rotate freely. However, the rollers then are free to drop out of the cage during handling and shipment of the assembly, and it is difficult to assemble the rollers and cage with respect to the bearing race and other elements with which the bearing is to be used. Moreover, vibration and the action of centrifugal force often cause the cage to take up an eccentric position with respect to the assembly whereby the rollers may be displaced with respect to each other.

In those constructions wherein the cage is designed to be positioned either inwardly or outwardly with respect to the pitch line of the bearing, the slots in the cage may be of less width than the diameter of the rollers. However, even then the assembly of the rollers with respect to the cage and the bearing races presents many difficulties.

Furthermore, while ball bearing units consisting of a complement of balls with retainisg cage members are frequently produced and handled independently of the race members with which they are to be employed, no similar form of unit embodying roller bearings and cage members are known or in common use in the industry.

In accordance with the present invention, these objections and limitations of roller bearing assemblies and cages are overcome and novel cage means are provided whereby roller bearings can be accurately positioned and held in place by a cage in a manner to permit ready assembly and retention of the rollers and cage in a bearing while permitting shipping and handling of the elements without danger of displacement.

These advantages are preferably attained by providing a novel type of cage having means carried thereby and projecting into position to prevent rollers located in the slots of the cage from being displaced relative to the cage. The roller retaining means are preferably formed integral with the cage and are designed to permit ready insertion of the rollers into the slots of the cage although they reduce the effective width of the slot and serve to hold the rollers in engagement with a race member.

The principal objects of the present invention are to simplify the assembly of roller bearings and to assure better retention and positioning of the rollers with respect to a cage during shipment, handling and use of the rollers and cage.

Another object of the invention is to provide an improved type of cage for roller bearings having means thereon for holding the rollers in place with respect to a race member.

Another object of the invention is to provide a cage for roller bearings having slots therein for receiving the rollers together with means serving to reduce the effective width of the slots so as to prevent displacement of the rollers with respect to a race member.

A further object of the invention is to provide a unit comprising a complement of rollers together wtih cage means therefor which is adapted to be handled and shipped independently of race members.

Another object of the invention is to provide novel methods for producing and using cages for roller bearings.

These and other objects and features of the present invention will appear from the following description thereof wherein reference is made to the figures of the accompanying drawing.

Figure 1:
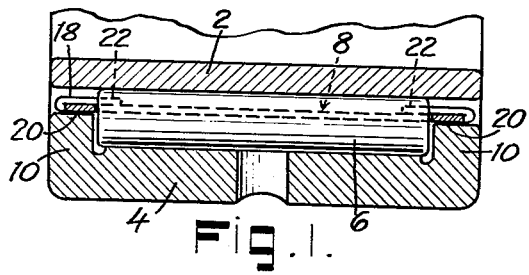
FIG. 1 is a sectional view taken radially through a typical form of bearing assembly embodying the present invention.

In that form of the invention chosen for purposes of illustration in FIGS. 1 to 4 of the drawing, a roller bearing assembly is shown wherein there is an inner race member 2 and an outer race member 4. Rollers 6 are located between and in engagement with the race members and are held in place by the cage 8. Since it is desirable to provide end thrust or abutment members in position to limit the endwise movement of the rollers, one race member, shown as the outer member 4, is provided with said portions 10 which extend inwardly from the bearing race at opposite sides thereof. The cage 8 is positioned so that its opposite edges extend outwardly beyond the rollers and may bear against the inner surface or lands of the side portions 10 of the outer race member so as to provide a "land riding cage."

Figure 4:
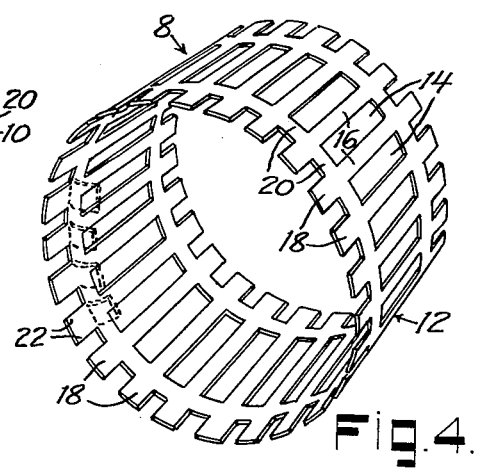
FIG. 4 is a perspective showing a typical blank from which the cage of FIGS. 1 to 3 may be made.

The cage 8 is of the type shown in FIG. 4 and consists of a cylindrical tube or sleeve 12 having roller receiving slots or openings 14 therein which extend lengthwise of the sleeve parallel to the axis thereof and are spaced apart by webs 16 which are of sufficient width to position the rollers in the desired spaced relation about the bearing. The slots 14 are of greater width and length than the rollers so that the rollers may be passed through the slots in the cage into engagement with the bearing surface of the race member.

The rollers 6 are retained in place within the slots of the cage by means which project inwardly from the sides of the slots so as to reduce the effective area of the slot. Thus, as shown in each of FIGS. 1 to 4, the tube 12 is formed with tabs or extensions 18 at the opposite edges thereof which are aligned with the webs 16 between the slots but are somewhat greater in width than webs 16. The tabs 18 also are of greater length than the width of the marginal portions 20 of the tube 12 at the ends of the slots 14. Therefore, when the tabs 18 are folded inwardly over the marginal portions 20 and the webs 16, the edges or corners 22 of the tabs project beyond the corners of the slots 14 and beneath or over the adjacent portions of rollers 6 located in the slots. The tabs 18 thus serve to reduce the effective areas of the slots and operate to hold the rollers in the slots.

Figure 3:
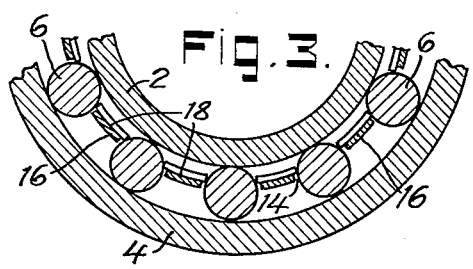
FIG. 3 is a sectional view of a portion of the assembly shown in FIGS. 1 and 2 taken at right angles to FIG. 1.

As shown in FIG. 3, the tabs 18 also serve to prevent displacement of the cage to a position eccentric to the bearing even when the slots 14 are of greater width than the diameter of the rollers. The cage 12 therefore may be located on the pitch line and the tabs 18 of the cage extend beneath the rollers preventing outward displacement of the cage to a position eccentric to the bearing. In this way, the cage not only serves to hold the rollers in the desired spaced relation, but the rollers serve to hold the cage in the desired concentric position with respect to the bearing and on the pitch line of the rollers.

Figure 2:
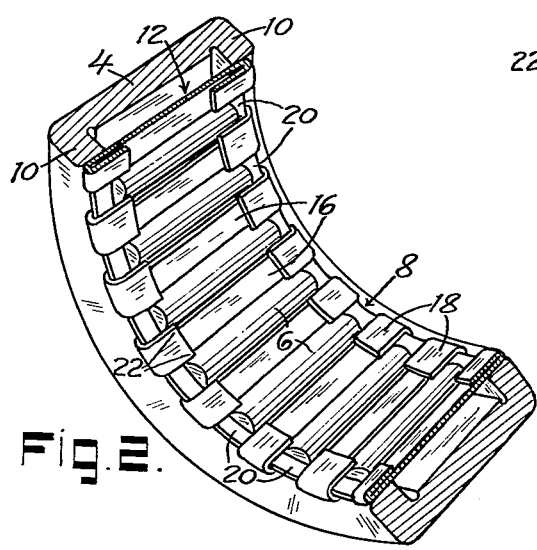
FIG. 2 is a perspective illustrating a portion of the assembly shown in FIG. 1.

In any event, when the cage is located on the pitch line of the rollers, the construction facilitates the assembly of the rollers and cage with the race members. The construction also serves to permit the rollers and cage to be assembled with one race member only as shown in FIG. 2 so as to provide an assembly which can be shipped and handled easily without danger of the rollers dropping out or being displaced. They are instead held in place adjacent the race by the inwardly folded tabs 18 of the cage.

As shown in FIG. 4, the cage 12 may be formed from a piece of metal tubing of the desired length, diameter and thickness, and the openings or slots 14 may be stamped out from the side walls of the tube while tabs 18 may be formed in the same operation by treatment of the end portions of the tube. The tabs may then be turned inwardly to an inclined or partially folded position as shown in dotted lines in FIG. 4 wherein the slots are still unobstructed, permitting insertion of the rollers but facilitating the final folding or inward bending of the tabs 18. The tube is then inserted into the outer race member 4 (or slipped over the inner race member 2) after which the rollers may be inserted through the slots 14 so as to engage the race member. Thereafter the tabs 18 are pressed down further against the marginal portion 20 of the cage so that they lie parallel to but in a different plane from the body of the cage. This further folding or bending of the tabs 18 serves to position the corners 22 of the tabs so that they project beyond the adjacent corners of the slots or openings 14 and beneath the ends and sides of the rollers. The corners are then in position to prevent withdrawal or displacement of the rollers from the openings whereby the rollers are retained in place on the race with which they have been assembled. In this way a permanent assembly may be produced which can be shipped and handled and can be inserted in place without the use of other or additional retaining means.

Figure 5:
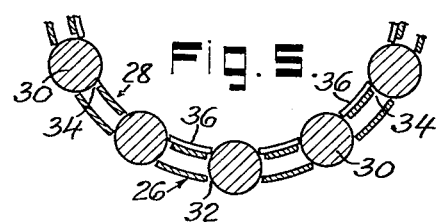
FIG. 5 is a sectional view through a unit embodying rollers and cage means which may be provided in accordance with the present invention.

The cage of the present invention also may be employed with a second cage as shown in FIG. 5 to provide a unit consisting of merely a complement of rollers and the cage means. Such units can be shipped and handled without any race member whatever for application to farm machinery or other equipment as replacement parts or original elements.

For this purpose the unit embodies two cage members indicated at 26 and 28 and a complement of rollers 30. The cage member 26, shown as an outer cage may be of any conventional type and has roller receiving slots 32 therein which are of less width than the diameter of the rollers but of sufficient width to permit the rollers to project beyond the cage to engage a race or member to which the unit is applied. The cage 28, shown as an inner cage, is of the type shown in FIG. 1 and has slots 34 therein which are of greater width than the diameter of the rollers. Cage 28 further is provided with extensions 36 which are adapted to be folded inwardly to restrict the effective area of the slots 34 and to extend beneath the rollers 30 so as to hold the rollers in place.

With this combination, the rollers can be inserted through the slots 34 in the inner cage and will rest against the edges of the slots 32 in the outer cage. The tabs 36 are then turned inward to hold the roller in place and when all of the rollers have been positioned and the tabs folded inward, the unit will hold the rollers in place and can be shipped and applied to machinery without danger of loss of the rollers.

Figure 7:
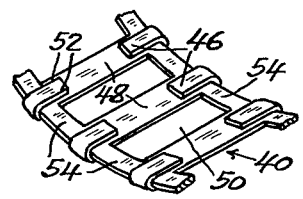
FIG. 7 is a perspective illustrating the portion of the cage employed in the assembly of FIG. 6.
Figure 6:
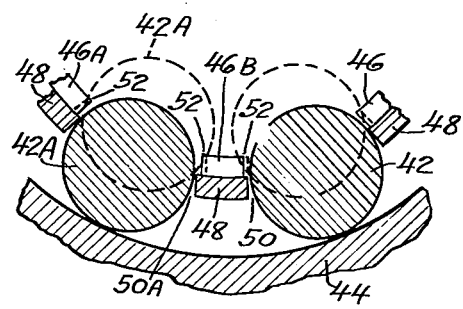
FIG. 6 is an enlarged sectional view through a preferred assembly embodying the present invention.

In the preferred form of the present invention shown in FIGS. 6 and 7 the cage 40 is located on or adjacent the pitch line of the rollers 42. The rollers and cage are assembled with an outer bearing race member 44 and are held in place by inwardly turned tabs or extensions 46 which are narrower than webs 48 between the roller receiving slots 50.

The extensions 46 although narrower than the webs 48 are positioned on the interior of the cage and closer to the axis of the bearing assembly. The adjacent edges or corners 52 of the extensions are therefore spaced apart a distance less than the diameter of the rollers. They therefore actually serve to reduce the effective area of the slot 50 and prevent displacement of the rollers radially inward from the cage and outer race member.

With this form of the invention the cage may be completely formed and the extensions 46 may be folded inward so as to contact the inner surface of the marginal portions 54 of the cage before the cage is assembled with the race member and rollers.

In assembling the cage and rollers with the race member of FIG. 6, the cage 40 with its extensions turned inward to the final flat positions shown is placed within the race member 44. A roller such as that indicated at 42A in FIG. 6 is then pressed radially outward in alignment with the slot 50A. When the roller is in the dotted line position of FIG. 6, its ends engage the edges or corners 52 of the inwardly turned extensions 46A and 46B. Then, as the roller is forced outward, the extensions 46A and 46B which are relatively short and resilient are forced apart to the dotted line position thereof allowing the roller to move outward from the dotted line position in which it engages the edges 52 to the full line position in which it engages the race member 44. The extensions then spring back to their normal position shown in full line as the roller is snapped into place. A full complement of rollers can thus be inserted into a completely formed cage and race member so that no further forming operations are required in order to assure proper positioning and retention of the rollers in the assembly. Moreover, this form of the invention renders it possible to form the slots 50 so that they provide a minimum of clearance for the rollers whereby they can be accurately positioned and aligned to assure proper functioning of the bearing under all conditions of use.

While the constructions shown and described are typical of various embodiments of the present invention, the form, size and arrangement of the various elements of the combination are capable of numerous changes and modifications to meet manufacturing conditions and to adapt the invention for use in various installations. In view thereof, it should be understood that the particular embodiments of the invention which are shown in the drawing and described above are intended to be illustrative only and are not intended to limit the scope of the invention.

I claim:

1. A roller bearing assembly comprising a race member having a bearing surface, a complement of rollers engaging the bearing surface of said race member, a tubular cage positioned parallel to said race member and on the pitch line of said rollers, said cage being provided with a plurality of webs spaced apart to define the opposite sides of roller receiving slots which are of greater width than the diameter of the rollers, the ends of said webs being connected to marginal portions of the cage which define the ends of the slots, and roller retaining means consisting of tabs formed integral with the marginal portions of the cage and positioned in alignment with said webs, said tabs extending inwardly from the outer edges of said marginal portions of the cage parallel to said webs and adjacent that face of the surface of said marginal portions of the cage which is remote from the bearing surface of the face, said tabs projecting inward beyond the ends of said slots and into position to limit the effective area of said slots, the rollers being movable through the slots in the cage into engagement with the bearing surface of the race member in assembling the elements of the roller bearing assembly, and said tabs preventing movement of said rollers away from said bearing surface during handling of the assembly.

2. The combination as defined in claim 1 wherein the race member is an outer race member, the rollers and cage are positioned within the race member, and said tabs are of less width than the webs of the cage.

References Cited in the file of this patent

UNITED STATES PATENTS

| | | |
|---|---|---|
| 1,147,497 | Freed | July 20, 1915 |
| 1,458,954 | Rouanet | June 19, 1923 |

FOREIGN PATENTS

| | | |
|---|---|---|
| 461,151 | Germany | June 13, 1928 |
| 319,728 | Great Britain | Apr. 24, 1930 |